United States Patent [19]
Aubert

[11] Patent Number: 5,422,377
[45] Date of Patent: Jun. 6, 1995

[54] MICROPOROUS POLYMER FILMS AND METHODS OF THEIR PRODUCTION

[75] Inventor: James H. Aubert, Albuquerque, N. Mex.

[73] Assignee: Sandia Corporation, Albuquerque, N. Mex.

[21] Appl. No.: 223,793

[22] Filed: Apr. 6, 1994

[51] Int. Cl.$^6$ .............................................. C08J 9/28
[52] U.S. Cl. ........................................ 521/64; 521/82; 521/97; 521/143; 521/146; 521/155; 521/182; 521/184
[58] Field of Search .................... 521/64, 82, 97, 143, 521/146, 155, 182, 184

[56] References Cited

U.S. PATENT DOCUMENTS 3,852,388 12/1974 Kimura ............................ 521/64
4,818,254 4/1989 Anand et al. .................... 521/64

Primary Examiner—Morton Foelak
Attorney, Agent, or Firm—Timothy D. Stanley

[57] ABSTRACT

A process for producing thin microporous polymeric films for a variety of uses. The process utilizes a dense gas (liquified gas or supercritical fluid) selected to combine with a solvent-containing polymeric film so that the solvent is dissolved in the dense gas, the polymer is substantially insoluble in the dense gas, and two phases are formed. A microporous film is obtained by removal of a dense gas-solvent phase.

5 Claims, 9 Drawing Sheets

MICROPOROUS POLYMER FILMS AND METHODS OF THEIR PRODUCTION

The United States Government has rights in this invention pursuant to Contract No. DEAC-04-76DP00789 between the Department of Energy and American Telephone and Telegraph Company.

BACKGROUND OF THE INVENTION

1. Field of the Invention

The invention relates to the production of microporous polymeric films for numerous uses ranging from high energy physics targets, biomedical structures for tissue ingrowth, filters, low dielectric films for electronic devices, asymmetric membranes, and the like. In particular, the microporous polymer films of the invention are produced by exposing a pressurized or dense gas (may be liquified or supercritical) that is not a solvent for the polymer or wherein the polymer is only sparingly soluble, to a polymer film that contains substantial solvent which is soluble in the dense gas. This results in the phase separation of the polymer/solvent film into two phases: a solvent-rich phase and a polymer-rich phase. Crystallization or glassing of the polymer, followed by removal of the solvent-rich phase and the dense gas then produces the dry microporous polymer films of the invention.

2. Description of the Related Art

Microporous polymeric films have numerous uses including: high-energy physics targets, biomedical devices, drug delivery systems, filters, asymmetric membranes, low dielectric films for electronic devices, and the like. To date, such microporous polymeric films have been produced by a variety of techniques, each of which suffers various disadvantages. In particular, certain methods require the use of large quantities of solvents, which are either toxic, or pose health, environmental, or safety concerns. In general, to make a microporous polymer film, a polymer/solvent film is exposed to a non-solvent bath which is usually an organic liquid in which the polymer is not soluble but in which the solvent from the film is soluble. After phase separation in the film, the solvent in the film is extracted by the non-solvent in the bath. Residual solvent and non-solvent in the film is later evaporated leaving behind a microporous polymer film. This process results in a requirement for a large non-solvent bath and solvent emissions into the air, either of which may pose environmental, disposal, and health concerns. Depending upon the desired end use of the foam, it is necessary to select a polymer that possesses suitable characteristics, e.g., for use in biomedical devices, the polymer should be biocompatible, and, in some instances, biodegradable.

In the case of microporous polymer films, several parameters are important. These parameters include the thickness of the film, the density of the film, the size and nature of the cells of the foam (whether the foam is open or closed celled), the adherence or adheribility of the foam to various substrates, and the presence and nature of any dense surface on the film. Once a polymer has been selected, these parameters may be influenced by selecting the solvent, the proportion of solvent to polymer, and the process used for producing the microporous polymer film.

There are several processes for making non-porous polymer/solvent films, including spin coating, dip coating, and doctor-blading, among others. In the spin coating technique, a polymer solution of predetermined concentration is poured onto the turntable which is then rotated at a predetermined speed. The speed of rotation, concentration of polymer solution (and hence viscosity of the polymer solution) determines the thickness of film that forms on the turntable. In the dip coating technique, an object to be coated is dipped into a solution of the desired polymer and then withdrawn. The thickness of the film is largely dependent upon the concentration (and hence viscosity) of the dipping solution and the speed of removal of the object being coated from the dipping solution. In the doctor-blading technique, a thin film of a polymer solution is provided on a substrate surface and a sharp blade (a doctor blade) traverses the surface to remove excess polymer solution and produce a thin film of the desired thickness.

As mentioned before, current techniques for producing a thin microporous polymer film requires subjecting a polymer/solvent film to quantities of solvents which may be objectionable from a health, environmental, or safety standpoint. There yet exists a need for a more universally applicable process that permits the use of a wide range of polymers with a minimal quantity of organic solvents while producing microporous polymeric film of a desired thickness, cell size, and cell morphology.

SUMMARY OF THE INVENTION

The invention provides microporous polymeric films and processes for producing these films from a wide variety of polymers. The microporous polymeric films of the invention may be customized for a desired density, cell size and morphology, and the processes of their production substantially reduces the required quantity of organic solvents.

According to the invention, a film of a polymer and a non-volatile solvent are subjected to a dense or pressurized gas (which may be a liquified gas or a supercritical fluid) that is not a solvent for the polymer or wherein the polymer is only sparingly soluble. As a result of exposing the polymer/solvent film to the dense gas, the dense gas diffuses into the film. Since the dense gas is soluble in the solvent of the film., but a non-solvent for the polymer, phase separation occurs and two phases form: a first phase containing primarily polymer; and a second phase containing dense gas and the solvent. These two phases may be dispersed within each other or may be bicontinuous. Simultaneously with the dense gas diffusing into the film, the solvent in the film diffuses out into the dense gas. Eventually, little solvent remains in the film. At some point with the solvent concentration decreasing, the polymer will either glass or crystalize. At this point, the phase separated morphology is locked in. When pressure on the system is relieved, the dense gas leaves the film taking with it any remaining solvent while leaving behind a dry microporous polymer film with a cell morphology dependent upon the relationship that had existed between the first and second phases. Typically, when the first and second phases are dispersed within each other, a microporous closed or open-celled foam is produced. When the first and second phases are bicontinuous, a foam resembling a network with large open cells is produced.

The invention permits the making of microporous polymer films from a wide variety of polymers. Further, the invention permits the customizing of these microporous films with respect to cell morphology, density, film thickness and film surface features. Further, by eliminating the use of a second solvent to form the pores in an organic film, the invention avoids the potential health, safety, and environmental hazards posed by other methods that require the use of such solvents.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE INVENTION

According to the present invention, three chemical components are utilized to produce a microporous polymer film: (1) a polymer which ultimately forms a foam structure, (2) a first solvent wherein the polymer is initially dissolved in order to form a solvent-containing polymeric film, and (3) a dense gas wherein the polymer is either insoluble or only marginally soluble and in which the solvent has some solubility. The dense gas may be a liquified gas or a supercritical fluid and is utilized to process the solvent-containing polymeric film into a microporous film. By appropriate selection of these three components and other process parameters, one of ordinary skill in the art may, without undue experimentation, produce microporous polymeric films for many ultimate end uses while using a minimal quantity of those organic solvents which might otherwise present potential hazards from a health, environmental, and safety standpoint.

The Polymer

According to the present invention, virtually any polymer can be utilized to produce a microporous polymer film. The foam structures of the invention can vary in thickness. However, the preferred foamed films range in thickness from about 1 $\mu m$ (1 $\mu m = 10^{-6}$ meter) to about 1000 $\mu m$ and most preferably from about 10 $\mu m$ to about 100 $\mu m$. Thickness desired depends upon end use of the foam. The useful polymers are those that can be combined with a non-volatile solvent to produce a polymer solution for processing into a thin film. In addition, the polymers should be of high molecular weight (above about 50,000 daltons, preferably above about 100,000 daltons) and have a glass transition temperature or a crystallization temperature above room temperature (about 20° C.) in order for the microporous polymer film to be dimensionally stable at room temperature. Polymeric films containing such polymers are referred to herein as "solvent-containing polymeric films." Such films are processable, according to the invention, into microporous polymeric films.

The preferred organic polymers for use in making bioresorbable medical foams are polylactic acid, polyglycolic acid, copolymers of lactic and glycolic acid, poly(epsilon-caprolactone), polyorthoesters, polyanhydrides poly(alpha-hydroxyesters), and the like. The preferred polymers for making other thin foams include polystyrene, polyurethane, polyethylene, polypropylene, poly(4-methyl-1-pentene), polyimide, and polyamic acid. As mentioned above, most organic polymers can be used in the process of the invention if the polymer is of high molecular weight, can be dissolved in a non-volatile solvent, and has either a glass transition temperature or crystallization temperature that is above room temperature.

Solvents for the Polymer

The first solvents suitable for use, according to the invention, are those solvents which will dissolve the polymer to produce a polymer solution that can be processed into a film. Additionally, the solvents should be non-volatile so that the film does not substantially dry out prior to its exposure to the dense gas. Preferably, these solvents may be reused so that solvent removed in forming the foam film does not pose an environmental, health, or safety hazard. Nonetheless, those non-volatile solvents typically used for producing polymeric films may be used, according to the invention.

Dense Gas Foam-Forming Agent

According to the invention, a solvent-containing polymeric film is subjected to a dense or pressurized gas that may be in a supercritical fluid state or liquified. The dense gas is selected such that it is a solvent for the first solvent that is used in conjunction with the polymer to form the solvent-containing polymeric film. Further, the dense gas is also selected so that the polymer of the film is either insoluble or only marginally soluble therein. Preferably, the dense gas should not be objectionable from a health, environmental, and safety standpoint. The preferred dense gas is carbon dioxide and may be used as liquified carbon dioxide or supercritical carbon dioxide.

A supercritical fluid, as understood by those of skill in the art, is a fluid at a temperature above its critical temperature and at a pressure above its critical pressure where only one phase exists, i.e., a second phase cannot be formed. Below the critical point, a gas can be condensed and a liquid can be evaporated. A supercritical fluid exhibits solubility properties like that of a liquid and molecular diffusion properties like that of a gas.

In order to facilitate understanding and description of the invention, the component or components used as a dense or pressurized gas (which can be a supercritical fluid or liquified gas) is hereinafter referred to as the "foam-forming agent." A variety of materials may be used as the foam-forming agent as long as the above preferred criteria are met. It is important that the foam-forming agent is a poor solvent or not a solvent for the particular polymer of the polymeric film.

Illustrative, but not limiting of the foam-forming agents are carbon dioxide ($T_c=31.1°$ C., $P_c=72.8$ atm), nitrogen ($T_c=147°$ C., $P_c=33.5$ atm), ethylene ($T_c=9.9°$ C., $P_c=50.5$ atm), ethane ($T_c-32.2°$ C., $P_c=48.2$ atm), propylene ($T_c=91.9°$ C., $P_c=45.4$ atm), propane ($T_c=96.7°$ C., $P_c=41.9$ atm), and the like, and mixtures thereof. For reasons of environmental compatibility, safety, and operating pressures, carbon dioxide and nitrogen are preferred. For ease of converting the compositions to a supercritical fluid state or liquified gas, and for ease of solubilizing solvent, carbon dioxide is the most preferred foam-forming agent. Carbon dioxide can be a solvent for many organic solvents at sufficient pressure, but polymers of high molecular weight have little or no solubility.

The Processes of the Invention

In general, the process of the invention includes the steps of:
- forming a film comprising a polymer, having a glass transition or crystallization temperature above about 20° C., dissolved in a first solvent;
- under predetermined pressure, contacting the film with a foam-forming agent, wherein the polymer is substantially insoluble, but the first solvent is able to dissolve readily;
- allowing the film to separate into two phases: a polymer-rich phase comprising essentially polymer and some small amount of foam-forming agent; and a solvent-rich phase including the first solvent and the bulk of the foam-forming agent;
- obtaining a microporous polymer film by separating the polymer-rich phase from the solvent-rich phase by modifying pressure or temperature conditions.

According to the invention, a polymeric film is first produced from a solution of the polymer in a first solvent by any of the conventional or other techniques. These techniques include spin coating, dip coating, doctor-blading, and the like. Regardless of the technique selected, the result is a solvent-containing polymeric film. This solvent-containing polymeric film is then subjected to the process of the invention to produce a thin, microporous foam.

According to the invention, the solvent-containing polymeric film is contacted with a selected "foam-forming agent," which is dense gas (which can be a liquified gas or a supercritical fluid) that is a solvent for the first solvent used to produce the polymeric film. Further, the foam-forming agent is either a poor solvent or not a solvent for the polymer of the polymeric film. After adding an amount of the foam-forming agent to the polymeric film, under pressure, a phase separation commences.

Figure 1:
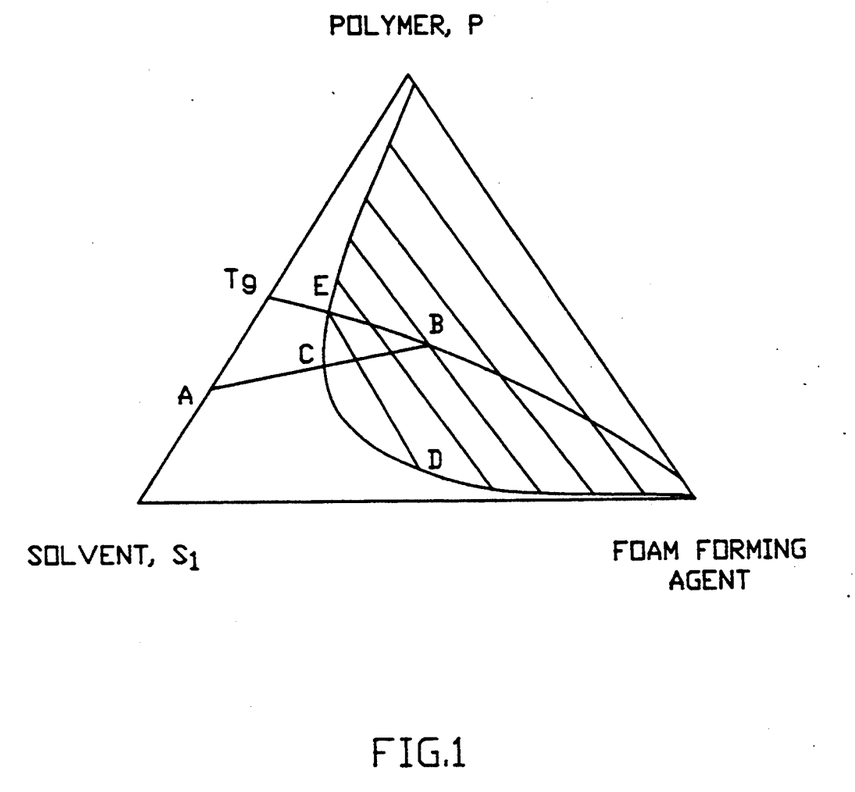
FIG. 1 is a three-component phase diagram.

This process is best understood with reference to the three-component phase diagram of FIG. 1. The starting point of the process is when the polymer film is formed. Point A of FIG. 1 is a polymer solution containing polymer P and solvent $S_1$. The solution A is spun into a film with thickness dependent upon the physical properties of the polymer solution and the spinning conditions, in particular, the spin speed.. The film is then exposed to the foam-forming agent $S_2$, which is preferably not a solvent for the polymer. In the most preferred process, $S_2$ is carbon dioxide gas ($CO_2$) at high pressure, preferably in a supercritical fluid state. Carbon dioxide is preferred because it is compatible with many organic solvents but does not dissolve many high molecular weight polymers.

When the solution is exposed to supercritical fluid $CO_2$, the $CO_2$ dissolves in the solution A because it is soluble in solvent $S_1$ of the solution. In the example of FIG. 1, $CO_2$ is totally soluble (miscible) with the solvent $S_1$. This need not always be the case. As the $CO_2$ enters the solution of the film, the composition of the film changes. In FIG. 1, the solution composition follows the line drawn from the starting point A to point B.

When the solution composition passes point C, the solution is no longer thermodynamically stable and separates into two liquid phases with different compositions. These compositions are shown connected by a tie-line, on the phase diagram of FIG. 1, represented by points D and E. One of the solutions, composition E, contains more polymer and is very viscous. The other solution, composition D, contains much less polymer and more solvent and is much less viscous. In general, when the composition of one solution contains so much polymer that the solution viscosity increases to a point that it will no longer flow, the glass transition of the solution, ($T_g$) is reached. This composition is represented by the $T_g$ line of FIG. 1.

When the $T_g$ line is crossed, no further phase separation occurs because the viscosity of solution E is too high for further change. At this point, the two interconnected phases are trapped. One phase contains more polymer and will form foam walls after solvent removal, and the other phase contains less polymer and more solvent and will form the pores of the foam after solvent removal. Alternatively, if the polymer is semicrystalline, then the polymer can crystallize which also effectively locks in the two-phase structure.

Exposure of the film to more $CO_2$ will result in exchange of solvent $S_1$ with $CO_2$ until practically all of the solvent $S_1$ is removed from the film. At this point in the process, the pressure of $CO_2$ is reduced to atmospheric pressure and $CO_2$ gas and entrained solvent $S_1$ is removed. The resultant film is microporous.

Figure 2:
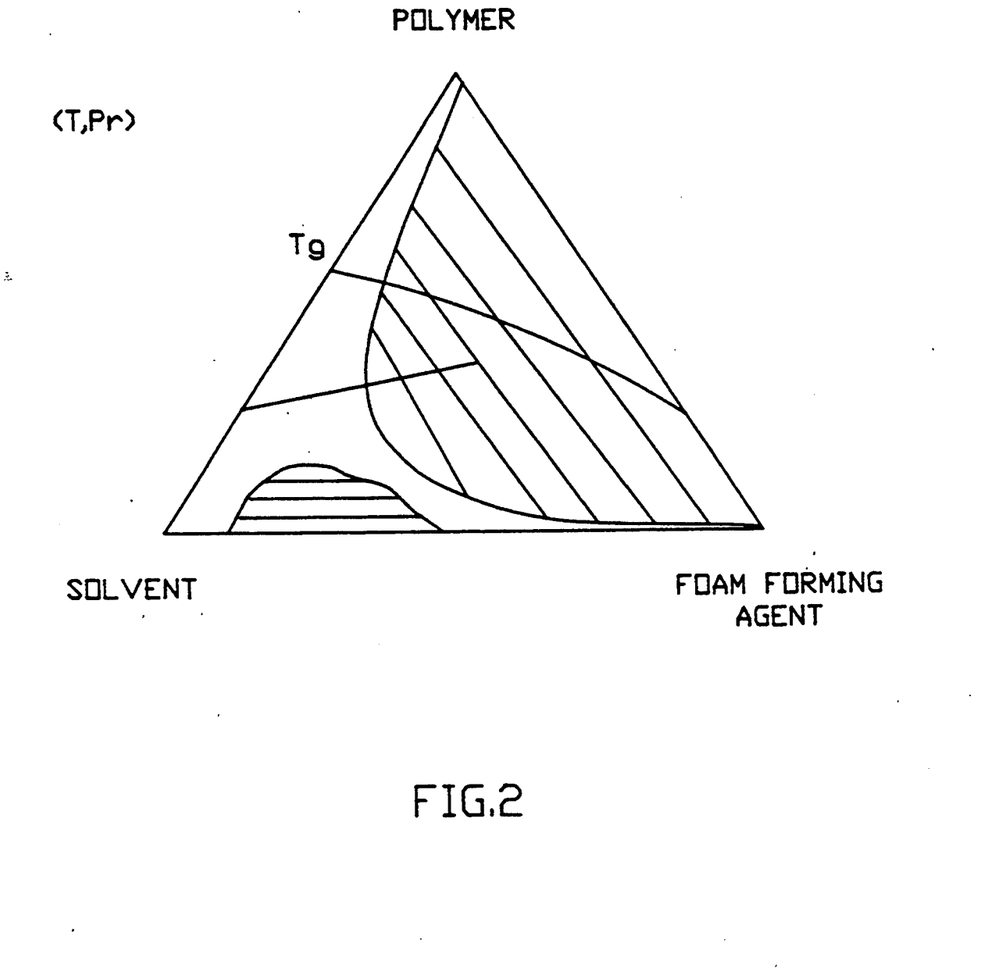
FIG. 2 is a three-component phase diagram.
Figure 3:
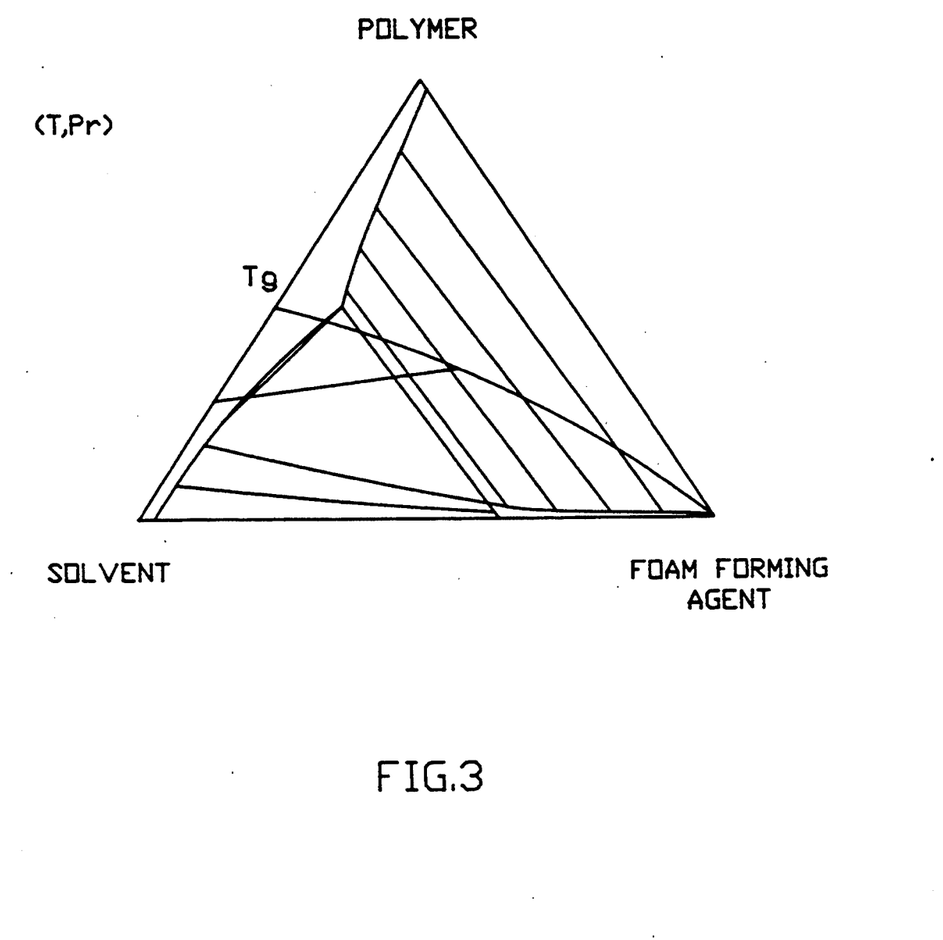
FIG. 3 is a three-component phase diagram.

In general, phase diagrams may be more complex than that depicted in FIG. 1. If the solvent $S_1$ and the foam forming agent are not miscible, then the phase diagram may look like FIG. 2, showing two areas where the solution is thermodynamically unstable and where the solution separates into two liquid phases with compositions connected by tie-lines. If the immiscibility between solvent and foam forming agent is even greater, then the two areas of immiscibility connect and the phase diagram becomes even more complicated, as shown in FIG. 3. This type of phase diagram has a triple point.

According to the invention, the spin coating process is preferred to produce polymeric films. During this process, the operator has control over polymer concentration, polymer molecular weight, solvent for the polymer, co-solvents, spinning speed, and temperature. By selectively controlling these variables, it is possible, according to the invention, to provide a range of solvent-containing polymer films with a given polymer that will vary in thickness and in the concentration of polymer. For example, higher spin speeds will result in thinner films. Higher polymer concentration (and higher viscosity) will result in thicker films.

The following examples are illustrative of the invention and do not in any way limit the scope of the invention as described above and claimed below.

EXAMPLE 1

Figure 4:
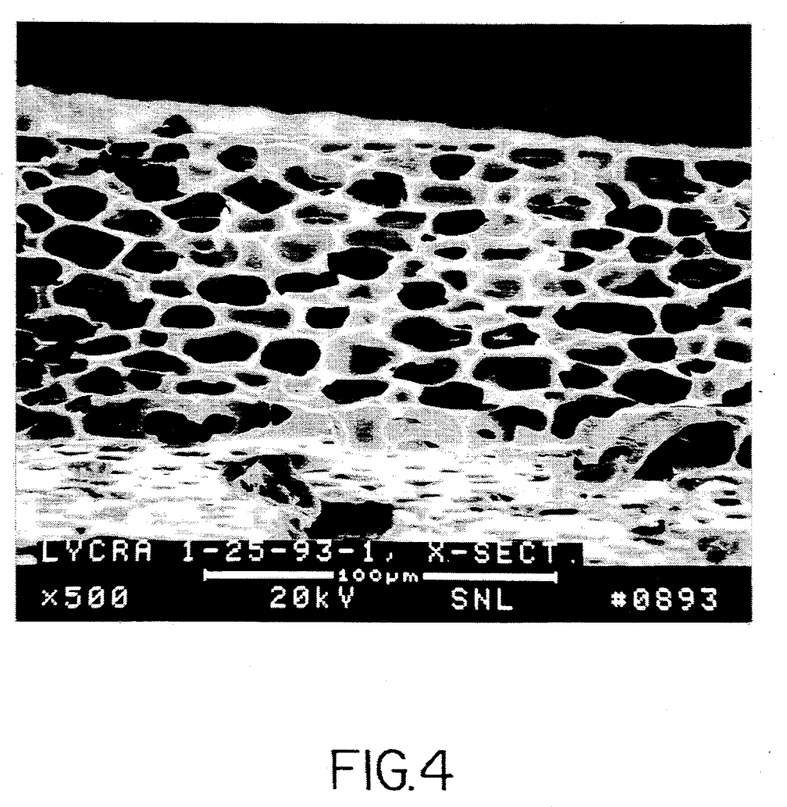
FIG. 4 is a scanning electron photomicrograph (SEM) of a freeze-fractured section of the resultant microporous polymer film showing the cross-section thickness and cell size.

A polyurethane foam film was prepared from a DuPont polyurethane, LYCRA ®, as a 30 wt. % solution in dimethylacetaamide (DMAC). This solution was diluted down by adding 26.74 g of DMAC to 22.69% of original solution resulting in a solution that was 13.77 wt. % LYCRA ®. This solution was spun on 50 mm×75 mm glass slides at 3000 RPM using a Headway Photo-resist spinner (Headway Research, Inc., 3713 Forest Lane, Garland, Tex.). The solution film was then exposed to $CO_2$ at 1400 psi for 12 hours. Thereafter, pressure was relieved and the $CO_2$ and DMAC removed. FIG. 4 shows a scanning electron photomicrograph (SEM) of a freeze-fractured section of the resultant open celled foamed film showing the cross-section thickness (100 μm) and cell size (20 μm).

EXAMPLE 2

Figure 5:
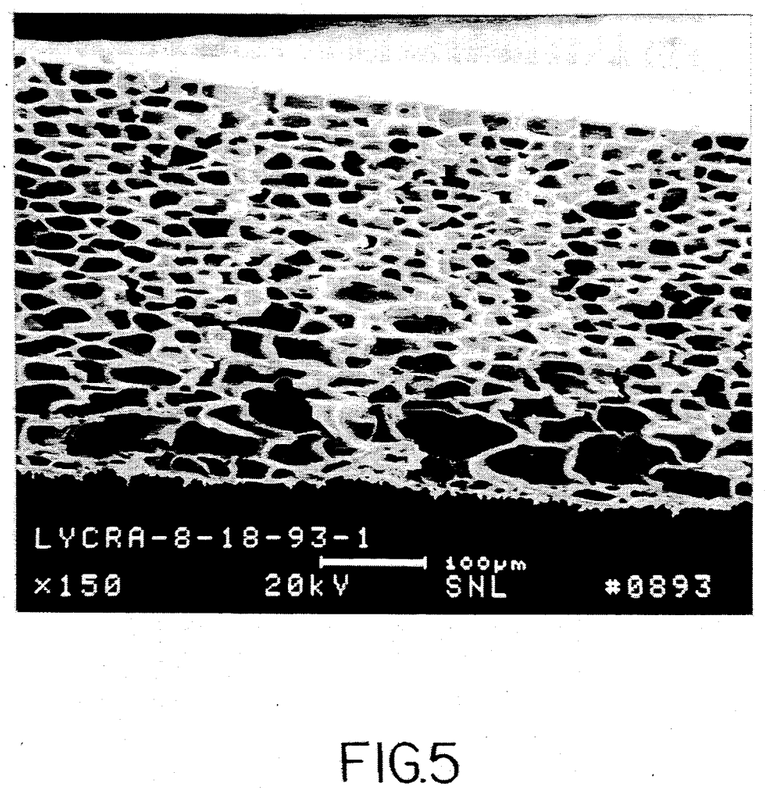
FIG. 5 is a scanning electron photomicrograph (SEM) of a freeze-fractured section of the resultant microporous polymer film showing the cross-section thickness and cell size.

A polyurethane foam film was prepared from a DuPont polyurethane, LYCRA ®, as a 30 wt. % solution in dimethylacetaamide (DMAC). This solution was diluted down by adding 26.75 g of DMAC to 22.69 g of original solution resulting in a solution that was 13.77 wt. % LYCRA ®. This solution was spun on 50 mm×75 mm glass slides at 1000 RPM using a Headway Photo-resist spinner (Headway Research, Inc., 3713 Forest Lane, Garland, Tex.). The solution film was then exposed to $CO_2$ at 1400 psi for 12 hours. Thereafter, pressure was relieved and the $CO_2$ and DMAC removed. FIG. 5 shows a scanning electron photomicrograph (SEM) of a freeze-fractured section of the resultant open celled foamed film showing the cross-section thickness (367 μm) and cell size (20 μm).

EXAMPLE 3

Figure 6:
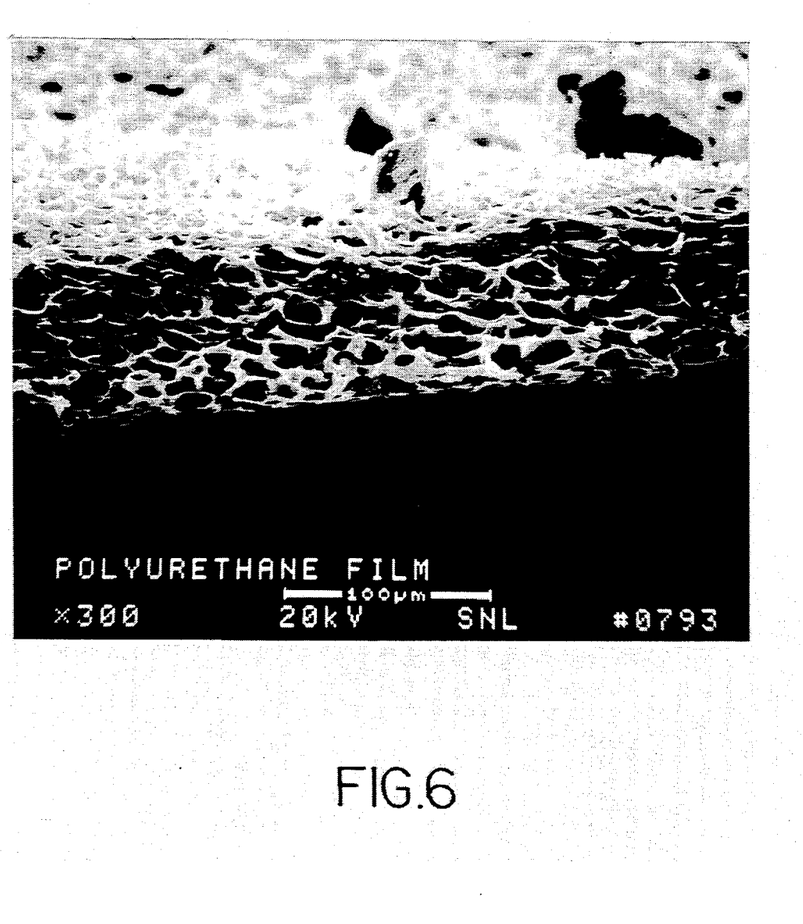
FIG. 6 is an SEM photomicrograph of a freeze-fractured cross-section of the resultant microporous polymer film.
Figure 7:
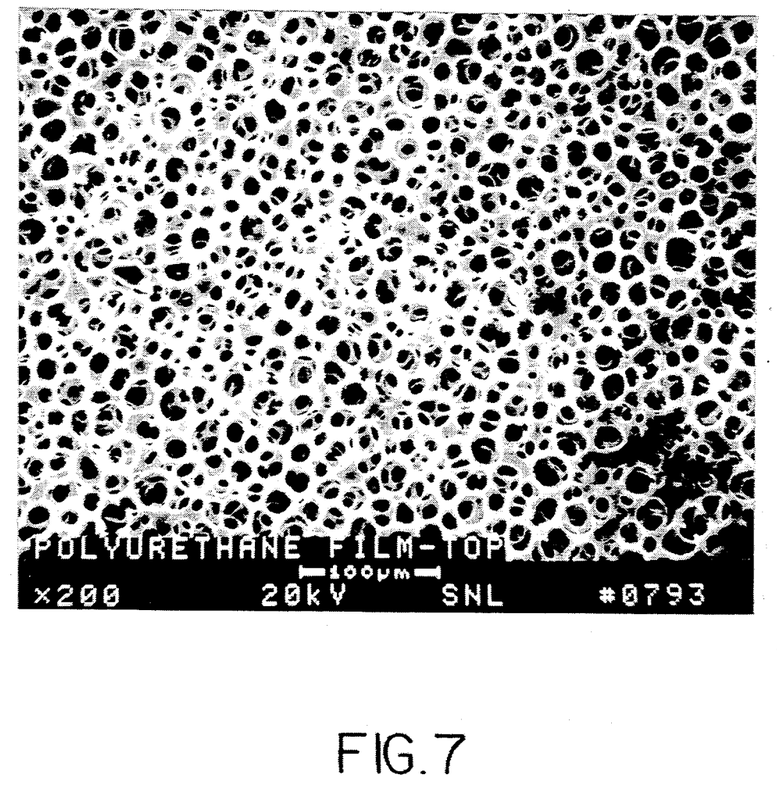
FIG. 7 illustrates the film surface after the plasma treatment.

A polyurethane foam film was prepared from a DuPont polyurethane, LYCRA ®, 30 wt. % solution in dimethylacetaamide (DMAC) which was diluted down to 20 wt. %. This solution was spun on a four-inch diameter silicone wafer at 3000 RPM for 10 seconds. The solution film was then exposed to $CO_2$ at 1400 psi for 12 hours. Thereafter, pressure was relieved and the $CO_2$ and DMAC removed as in Examples 1 and 2. An SEM photomicrograph of a freeze-fractured cross-section of the resultant open celled foamed film is shown in FIG. 6. The film thickness is 100 μm and the cell size is 15 μm. The film surfaces (top and bottom) were treated in an oxygen plasma to remove a small solid (non-porous) film. The film surface after the plasma treatment is shown in FIG. 7.

EXAMPLE 4

A porous film of Poly-4-methyl-1-pentene (high molecular weight, produced by Aldrich Chemical Company) was prepared by dissolving 10 g of poly-4-methyl-1-pentene in 50 cc of decahydronaphthalene solvent at 185° C. The solution was spun on 50 mm×75 mm glass slides at 1000 RPM. The solution film was then exposed to 1400 psi $CO_2$ for 12 hours. Thereafter, the $CO_2$ and solvent were removed by releasing the system pressure. A submicron cell-sized foam was obtained.

EXAMPLE 5

Figure 8:
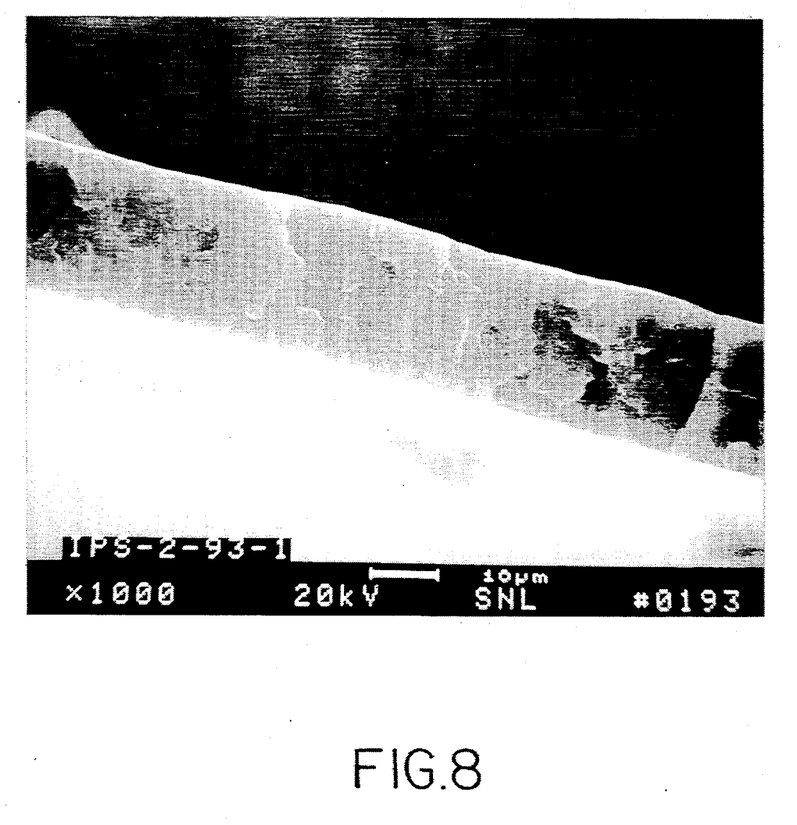
FIG. 8 is an SEM photomicrograph of a freeze-fractured section of the resultant film showing a nonporous film.

A solid polystyrene film (with no porosity) was prepared by dissolving 2.10 g of isotactic polystyrene (Pressure Chemical Co., 3419-25 Smallman St., Pittsburgh, Pa. 15201, Lot No. $PS_{70202}$) in 30.54 g 1-bromonaphthalene at 200° C. to produce a 6.43 wt. % solution, which was spun onto a 50 mm×75 mm glass slide at 2000 RPM. The solution film was then exposed to 1400 psi $CO_2$ for 12 hours. After relieving pressure to remove $CO_2$ and solvent, an SEM photomicrograph of a freeze-fractured cross-section of the resultant film was taken, as shown in FIG. 8. The film thickness is 20 μm and there is no evidence of any porosity. A phase diagram which possibly explains this result is shown in FIG. 3.

EXAMPLE 6

Figure 9:
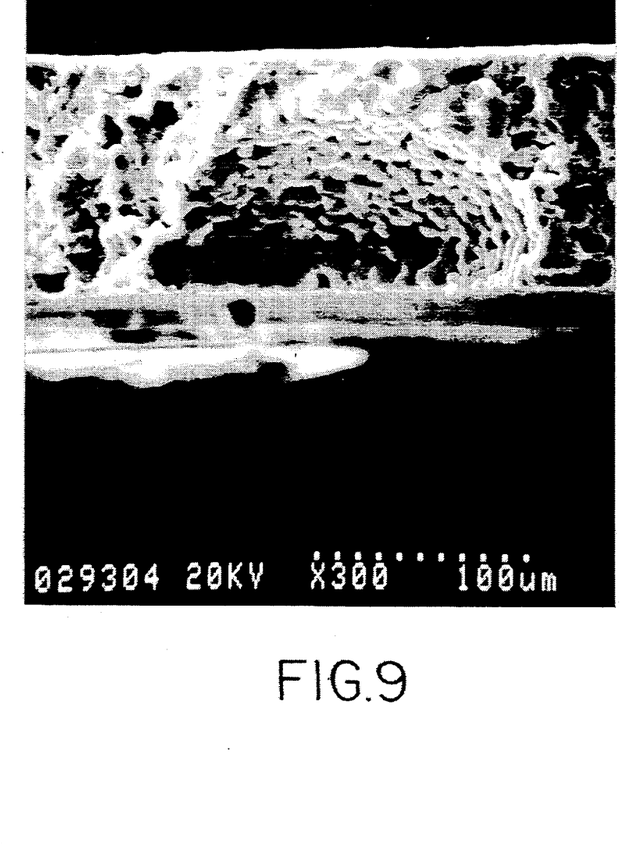
FIG. 9 is an SEM photomicrograph of a freeze-fractured cross-section of the microporous polymer film produced according to the invention.

A porous polystyrene film was prepared by dissolving 1.84 g of isotactic polystyrene (Pressure Chemical Co., 3419-25 Smallman Street, Pittsburgh, Pa. 15202, Lot #$PS_{70202}$) in 25.64 g 1-bromonaphthalene and 1 cc of 1-dodecanol at 200° C. This resulted in a 6.43 wt. % solution which was poured into a pan to create a thin film. The 1-dodecanol was added to the solution in order to increase the solubility of $CO_2$ in the solution. It is theorized that this system behaves like the phase diagram depicted in FIG. 2. The solution film was then exposed to 1400 psi $CO_2$ for 12 hours. Thereafter, $CO_2$ and solvent were removed by pressure release. An SEM photomicrograph of a freeze-fractured cross-section of the open-celled foam film produced is shown in FIG. 9. The film thickness is 113 μm and the cell size is around 10 μm.

Although the invention has been described with reference to its preferred embodiments, those of ordinary skill in the art may, upon reading this disclosure, appreciate changes and modifications which may be made and which do not depart from the scope and spirit of the invention as described above and claimed below.

What is claimed is:

1. Process for preparing a thin microporous foam film, the process comprising:
    (a) forming a film of a solution, said solution comprising an organic polymer, selected from the polymers having glass transition or crystallization temperature above about 20° C., dissolved in a first solvent;
    (b) contacting, under a predetermined pressure, said film with a foam-forming agent which is a dense gas that is a solvent for said first solvent and wherein said organic polymer is substantially insoluble;
    (c) allowing the film to separate into two phases: a polymer-rich phase and a solvent-rich phase comprising the first solvent and the foam-forming agent; and
    (d) obtaining a microporous foam film from the polymer-rich phase by modifying temperature or pressure conditions to remove the solvent-rich phase.

2. The process of claim 1, wherein said contacting with a foam-forming agent comprises contacting with a dense gas selected from the group consisting of carbon dioxide, nitrogen, ethane, ethylene, propane, and propylene.

3. The process of claim 1, wherein said contacting under predetermined pressure comprises contacting with carbon dioxide in a supercritical state.

4. The process of claim 1, wherein said organic polymer is selected from the group consisting of polystyrene, polyurethane, polyethylene, polypropylene, poly(4-methyl-1-pentene), polyimide, polyamic acid, polylactic acid, polyglycolic acid, copolymers of lactic and glycolic acids, poly(epsilon-caprolactone), polyorthoesters, polyanhydrides, and poly(alphahydroxyesters).

5. The process of claim 1, wherein said forming of a film comprises forming a film of thickness ranging from about 1 to about 1,000 microns.

* * * * *